United States Patent
Shivamurthy

(10) Patent No.: US 11,370,429 B2
(45) Date of Patent: Jun. 28, 2022

(54) DISTANCE CONTROL FOR A VEHICLE WITH TRAILER

(71) Applicant: Connaught Electronics Ltd., Tuam (IE)

(72) Inventor: Swaroop Kaggere Shivamurthy, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 253 days.

(21) Appl. No.: 16/499,621

(22) PCT Filed: Mar. 27, 2018

(86) PCT No.: PCT/EP2018/057729
§ 371 (c)(1),
(2) Date: Sep. 30, 2019

(87) PCT Pub. No.: WO2018/178052
PCT Pub. Date: Oct. 4, 2018

(65) Prior Publication Data
US 2020/0039514 A1 Feb. 6, 2020

(30) Foreign Application Priority Data

Mar. 31, 2017 (DE) .................... 10 2017 106 952.6

(51) Int. Cl.
*B60W 30/16* (2020.01)
*G05D 1/00* (2006.01)
*G06V 20/56* (2022.01)

(52) U.S. Cl.
CPC .......... *B60W 30/16* (2013.01); *G05D 1/0088* (2013.01); *G06V 20/588* (2022.01);
(Continued)

(58) Field of Classification Search
CPC .......... B60W 30/16; B60W 2554/804; B60W 2552/00; B60W 2554/801; G05D 1/0088; G05D 2201/0213; G06K 9/00798
(Continued)

(56) References Cited

U.S. PATENT DOCUMENTS

2010/0332049 A1* 12/2010 Sy .................. B60T 8/1708
701/1
2012/0119894 A1* 5/2012 Pandy ............. B60W 30/16
701/96
(Continued)

FOREIGN PATENT DOCUMENTS

DE 102007012955 A1 * 12/2007 .............. G01C 3/22
DE 102007012955 A1 12/2007
(Continued)

OTHER PUBLICATIONS

International Search Report and Written Opinion issued in corresponding International Patent Application No. PCT/EP2018/057729, dated Oct. 4, 2018 (10 pages).
(Continued)

*Primary Examiner* — Russell Frejd
*Assistant Examiner* — Matthias S Weisfeld
(74) *Attorney, Agent, or Firm* — Osha Bergman Watanabe & Burton LLP

(57) ABSTRACT

The present invention refers to a method for controlling a distance of a vehicle (10) to a closest preceding vehicle (60), whereby the vehicle (10) has a trailer (12) connected thereto, comprising the steps of determining a velocity of the vehicle (10), detecting a closest preceding vehicle (60), determining a distance (62) to the closest preceding vehicle (60), and determining a safe distance based on the velocity of the vehicle (10) and the distance (62) to the closest preceding vehicle (60), wherein the method further comprises deter-
(Continued)

Figure 1:
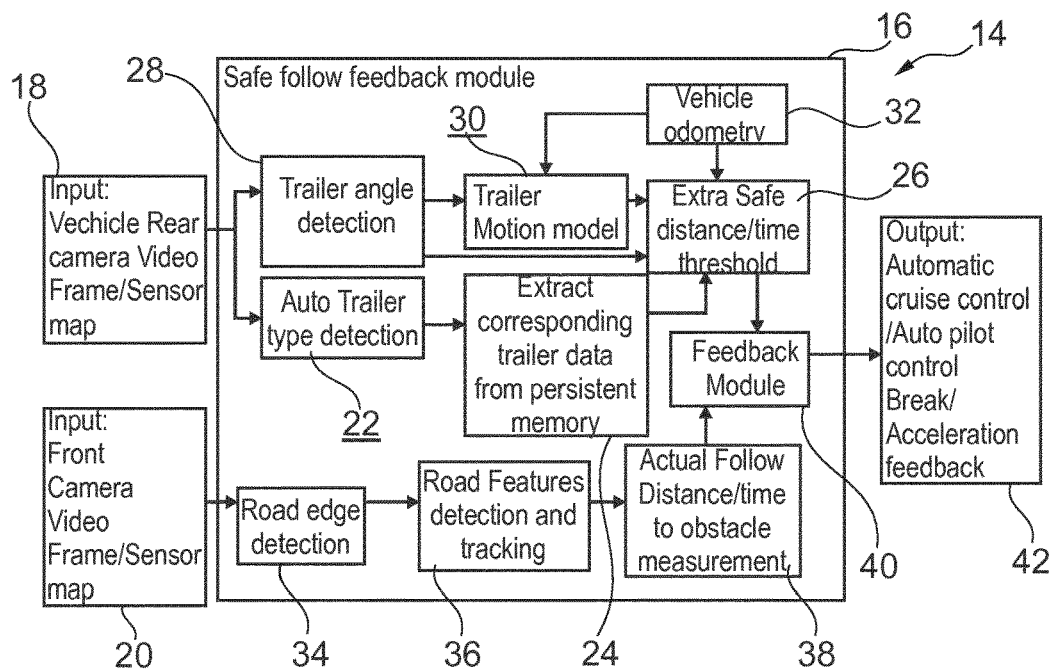

mining an extra safe distance based on at least one characteristic of the trailer (12), and performing a control of the distance (62) to the closest preceding vehicle (60) to stay above the safe distance plus the extra safe distance. The present invention also refers to a driving assistance system (14) for a vehicle (10), which is adapted to perform the above method. The present invention further refers to a vehicle (10) with an above driving assistance system (14).

9 Claims, 3 Drawing Sheets

(52) U.S. Cl.
CPC ... *B60W 2552/00* (2020.02); *B60W 2554/801* (2020.02); *B60W 2554/804* (2020.02); *G05D 2201/0213* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 2013/0028473 A1* | 1/2013 | Hilldore | ................ | G06V 20/56 |
| | | | | 382/103 |
| 2014/0160276 A1* | 6/2014 | Pliefke | .................. | H04N 7/183 |
| | | | | 348/118 |
| 2016/0176403 A1 | 6/2016 | Weston | | |
| 2016/0257341 A1* | 9/2016 | Lavoie | ............ | B60W 30/18036 |
| 2017/0287320 A1* | 10/2017 | Meade | ................... | G08C 17/02 |
| 2018/0105172 A1* | 4/2018 | Gesch | ................. | B60W 30/165 |

FOREIGN PATENT DOCUMENTS

| | | |
|---|---|---|
| DE | 102008019519 A1 | 6/2009 |
| DE | 102013206874 A1 | 11/2014 |
| DE | 102013013243 A1 | 2/2015 |
| DE | 102015108681 A1 | 12/2016 |
| DE | 102015217555 A1 | 3/2017 |
| EP | 0729860 A2 | 9/1996 |
| EP | 0982173 A2 | 3/2000 |
| EP | 2690460 A1 | 1/2014 |
| WO | 00/09357 A1 | 2/2000 |

OTHER PUBLICATIONS

Ying-Che Kuo et al: "Vision-based vehicle detection for a driver assistance system", Computers & Mathematics With Applications, vol. 61, No. 8, Sep. 9, 2010, pp. 2096-2100 (5 pages).
Search Report issued in corresponding German Patent Application No. 10 2017 106 952.6, dated Jun. 12, 2017 (7 pages).

* cited by examiner

DISTANCE CONTROL FOR A VEHICLE WITH TRAILER

The present invention refers to a method for controlling a distance of a vehicle to a closest preceding vehicle, whereby the vehicle has a trailer connected thereto, comprising the steps of determining a velocity of the vehicle, detecting a closest preceding vehicle, determining a distance to the closest preceding vehicle, and determining a safe distance based on the velocity of the vehicle, and the distance to the closest preceding vehicle.

The present invention also refers to a driving assistance system for a vehicle, which is adapted to perform the above method to control a distance of the vehicle to a closest preceding vehicle.

The present invention further refers to a vehicle with an above driving assistance system.

One frequent type of vehicle accidents occurring on highways is a vehicle bumping into a back of a preceding vehicle. In such cases, the vehicle that bumps into the preceding vehicle is usually fully responsible and blameworthy. Even if the preceding vehicle stops abruptly or slows down suddenly, the onus is on the driver of the vehicle travelling behind the preceding vehicle, to demonstrate that he kept a sufficient safe distance to the preceding vehicle.

Hence, in particular in automated driving systems, safe distance calculation and application thereof is extremely important, in particular for highway traffic situations. In such highway traffic situations, compared to urban traffic situations, there will typically be no frequent inconsistency in rate of change of vehicle acceleration. In highway situations, a vehicle following a preceding vehicle requires a safe distance. The safe distance can be equivalent e.g. to a distance traveled in two seconds driving time, i.e. the safe distance is the distance the vehicle travels in two seconds at a current speed. According to another calculation, the safe distance can be calculated as half of the vehicle speed, as measured in kilometers per hour, in meters.

However, determination of a safe distance measurement can be improved under consideration of a velocity of other vehicles, in particular a preceding vehicle directly ahead of the vehicle. Typically, safety can be increased by adding a few extra meters safe distance between the vehicles depending on the speed of the vehicle. By managing such safe distance, a driver of the vehicle will have time to handle any sudden changes happening, and the safe distance can be reduced to a minimum based on current traffic situations, which increases capacity of a road.

The problem is typically more complicated for vehicles with trailer. An applicable safe distance can vary for trailers with different parameters associated with each trailer. Trailer swaying at a particular angle compared to the vehicle is more unstable compared to the trailer being aligned straight behind the vehicle. This also affects situations when breaking is required. Hence, the safe distance of vehicles with trailers has to be calculated differently compared to vehicles without trailer to be most appropriate for each traffic situation.

In this context, document EP 2 690 460 A1 refers to an apparatus and a method for calculating an inter-vehicle distance that calculates a more accurate inter-vehicle distance. The inter-vehicle distance is calculated by setting a physical limit value, by recognizing an inter-vehicle distance error occurring due to reasons such as an installation location of a sensor, a type of a vehicle, illegal remodeling of the vehicle, and the like, and thereby correcting an inter-vehicle distance.

Furthermore, document EP 0 982 173 A2 refers to a system and method for determination of a minimum separation distance when a vehicle is operating in a cruise control mode. The velocity and deceleration capability and reaction time of a host vehicle are used in conjunction with the velocity and an assumed deceleration capability of a lead vehicle to calculate a minimum separation distance. The deceleration capability of the host vehicle is estimated based on the condition of the service brakes, the braking capabilities of the transmission/engine and the braking capability of a retarder.

Still further, document EP 0 729 860 A2 refers to a system and method for implementing an intelligent cruise control using standard engine control modes. The system includes a distance sensor to determine the distance and closing rate relative to a forward vehicle and uses this information to implement a distance control mode and a speed control mode. The distance control mode maintains a selectable headway range relative to a forward vehicle and may include accelerating the vehicle or decelerating the vehicle by defueling, engaging an engine brake (retarder), or downshifting the transmission when engine speed permits. The speed control mode maintains a selectable cruising speed if no target vehicle is detected. This cruising speed set point also functions as an upper limit while in the distance control mode. The system and method effect the intelligent cruise control functions utilizing control logic external to the electronic engine control module utilizing the engine speed control mode or engine speed and torque limiting control mode of SAE J1922 or SAE J1939 standards. Alternatively, a cruise control limit speed may be broadcast via SAE J 1587 to reduce the vehicle speed upon approaching a forward vehicle so as to reduce the need for driver intervention. The invention may periodically switch between engine control modes to avoid any control mode timeout imposed by some engine manufacturers.

It is an object of the present invention to provide a method for controlling a distance of a vehicle to a closest preceding vehicle, whereby the vehicle has a trailer connected thereto, a driving assistance system for such a vehicle, which is adapted to perform the above method, and a vehicle with such a driving assistance system, which enable improved safety when driving the vehicle with a trailer, and which are easy to implement.

This object is achieved by the independent claims. Advantageous embodiments are given in the dependent claims.

In particular, the present invention provides a method for controlling a distance of a vehicle to a closest preceding vehicle, whereby the vehicle has a trailer connected thereto, comprising the steps of determining a velocity of the vehicle, detecting a closest preceding vehicle, determining a distance to the closest preceding vehicle, and determining a safe distance based on the velocity of the vehicle and the distance to the closest preceding vehicle, the method further comprising determining an extra safe distance based on at least one characteristic of the trailer, and performing a control of the distance to the closest preceding vehicle to stay above the safe distance plus the extra safe distance.

The present invention also provides a driving assistance system for a vehicle, which is adapted to perform the above method to control a distance of the vehicle to a closest preceding vehicle.

The present invention further provides a vehicle with an above driving assistance system.

The basic idea of the invention is to add an extra safe distance based on the trailer to the safe distance of the vehicle without trailer. The extra safe distance is determined based on the characteristics of the trailer, so that it will be most suitable for a combination of the vehicle with a particular trailer. The safe distance together with the extra safe distance provide a sufficient margin, so that also the vehicle with the trailer can be reliably operated in all traffic conditions.

Preferably, the driving assistance system comprises environment sensors, which provide information about an environment surrounding the vehicle. Such environment sensors can comprise e.g. cameras, in particular stereo cameras, radar systems, laser based systems including a LIDAR, in particular a laser scanner, and others.

The at least one characteristic of the trailer can comprise any suitable characteristic, that allows to determine a particular behavior of the trailer or the vehicle with the trailer when being moved. Hence, such a characteristic can comprise any suitable physical data of the trailer alone or in combination with the vehicle. One such physical data is a weight of the trailer or a relation between weight of the trailer and weight of the vehicle. In addition, characteristics like braking capabilities or others can be considered. Furthermore, a charged weight of the trailer can be a relevant characteristic. The characteristics can be stored in a memory of the driving assistance system. Hence, the characteristics can be easily retrieved from the memory, in particular from a persistent memory, e.g. upon a selection made by a driver of the vehicle. Alternatively, the characteristics can be retrieved from a server via a data connection established by the vehicle or, in particular, the driving assistance system.

The closest preceding vehicle typically refers to a vehicle directly ahead of the own vehicle. Vehicles approaching on lanes belonging to opposite driving directions are not considered. Furthermore, in situations with multiple lanes for the same direction, the closest preceding vehicle typically refers to the closest preceding vehicle on the same lane. Other vehicles can be considered depending on driving situations, e.g. when changing a lane or driving a curve.

The safe distance refers to a distance that enables the vehicle to perform a stop without bumping against any preceding vehicle. It can be based on the assumption of the closest preceding vehicle coming to an immediate stop, e.g. in case of an accident, or the closest preceding vehicle making an immediate breaking maneuver at maximum retardation, or any other suitable retardation.

The extra safe distance is an additional safe distance, which is added to the safe distance based on additional requirements when towing the trailer.

The velocity of the closest preceding vehicle can be determined as an absolute value or as a value relative to the speed of the vehicle.

The safe distance as well as the extra safe distance can be defined in distance or time. When specified in time, the safe distance and extra safe distance are equivalent to the distance traveled in the specified time at a current speed. It is not required to explicitly determine the distance when using the time definition.

According to a modified embodiment of the invention, the step of determining an extra safe distance based on at least one characteristic of the trailer comprises determining trailer dimensions and determining the extra safe distance under consideration of the trailer dimensions. Trailer dimensions can be automatically detected, e.g. by a camera provided at a rear side of the vehicle, or can be provided by e.g. a driver of the vehicle as a setting. The dimensions can be stored in a memory of the driving assistance system. Hence, the characteristics can be easily retrieved from the memory, in particular from a persistent memory, e.g. upon a selection made by a driver of the vehicle. Trailer dimensions may comprise a length and width as well as height of the trailer. In particular, the height can be important e.g. in case of wind. The trailer dimensions affect the behavior of the trailer and consequently a behavior of the vehicle, in particular when accelerating or retarding the vehicle, as typically done by respective driving assistance systems. Trailer dimensions can also indirectly indicate a possible weight of the trailer, i.e. a bigger trailer generally can have a higher weight when fully loaded than a smaller trailer.

According to a modified embodiment of the invention, the method comprises an additional step of identifying a type of the trailer, and the step of determining an extra safe distance based on at least one characteristic of the trailer comprises determining the at least one characteristic of the trailer based on the type of the trailer. Hence, the vehicle can perform an automatic detection of the trailer, e.g. based on a camera provided at a rear side of the vehicle, or the type of the trailer can be provided by e.g. a driver as a setting of the vehicle. The vehicle can either have a database incorporated for at least most common trailers, so that the dimensions can be obtained by accessing the data base. Alternatively, the vehicle is connectable e.g. via a wireless internet connection to a server, which provides the at least one characteristic to the vehicle based on the identified type of trailer.

According to a modified embodiment of the invention, the step of determining an extra safe distance based on at least one characteristic of the trailer comprises determining an angle of the trailer in respect to the vehicle and determining the extra safe distance under consideration of the angle of the trailer in respect to the vehicle. Trailers at curves can lead to unstable driving condition. Hence, vehicles with trailers at curves should keep an increased safe distance to the closest preceding vehicle compared to a trailer travelling straight. The determination of the angle of the trailer in respect to the vehicle can be based e.g. on a tow bar detection and segmentation.

According to a modified embodiment of the invention, the step of determining an extra safe distance based on at least one characteristic of the trailer comprises determining a trailer motion model and determining the extra safe distance under consideration of the trailer motion model. Each trailer has its own motion characteristics. The motion characteristics can be an important factor, which allows predicting trailer movement and in particular sway conditions. The safe distance should be larger near to trailer sway conditions, whereas in conditions without trailer sway, a shorter safe distance can be applied. Based on the motion model, the behavior of the trailer in different driving situations can be determined or even anticipated, so that dangerous trailer sway conditions can be avoided, already before such a condition is about to occur. The trailer motion model preferably receives as input odometry information of the trailer and the angle of the trailer in respect to the vehicle.

According to a modified embodiment of the invention, the method comprises receiving odometry data of the trailer, and the step of determining an extra safe distance based on at least one characteristic of the trailer comprises determining the extra safe distance under consideration of the odometry data of the trailer. The trailer is moved with the vehicle, so that odometry data of the vehicle can be applied to the trailer, or the odometry data of the vehicle can be used to determine odometry data of the trailer. Hence, the odometry data can be provided based on at least one sensor provided at the trailer or at the vehicle.

According to a modified embodiment of the invention, the method comprises receiving a velocity of the trailer, and the step of determining an extra safe distance based on at least one characteristic of the trailer comprises determining the extra safe distance under consideration of the velocity of the trailer. The vehicle tows the trailer, so that the velocity of the vehicle directly applies to the trailer. Hence, the trailer velocity can be derived from odometry data of the vehicle or of the trailer. The higher the velocity of the trailer, the bigger the extra safe distance.

According to a modified embodiment of the invention, the step of performing a control of the distance to the closest preceding vehicle to stay above the safe distance plus the extra safe distance comprises determining a distance to the closest preceding vehicle, comparing the distance to the closest preceding vehicle to the safe distance plus the extra safe distance, and controlling the vehicle to reduce the distance to the closest preceding vehicle, if the distance to the closest preceding vehicle is bigger than the safe distance plus the extra safe distance, and controlling the vehicle to increase the distance to the closest preceding vehicle, if the distance to the closest preceding vehicle is smaller than the safe distance plus the extra safe distance. This control is suitable e.g. for autonomous cruise control or as part of an automatic driving control. Based on the desired distance to the preceding vehicle, i.e. the safe distance plus the extra safe distance, the control is performed to keep this distance. The control is preferably performed under additional consideration of further control parameters including speed limits, a pre-set preferred traveling velocity, and traffic conditions. In general, the control is performed to not go below the desired distance to the preceding vehicle, whereas an increase of the distance to the preceding vehicle compared to the desired distance is tolerated, as long as it is based on additional control input. Hence, the vehicle can be controlled to break or accelerate depending on the desired distance to the preceding vehicle compared the current distance to the closest preceding vehicle.

According to a modified embodiment of the invention, the step of determining a distance to the closest preceding vehicle comprises determining a road feature when appearing for a first time at a back of the closest preceding vehicle, determining a distance to the road feature with a pre-set period, until the road feature is not visible, determining a change in distance of the road feature for each period, and summing up the changes in the distance for all periods. Hence, the method is intended to measure time taken for a road feature to emerge out of the closest preceding vehicle and reach the vehicle. This information can be used to determine a distance to the closest preceding vehicle and to anticipate a possible collision in case of an emergency. This can be applied to control a velocity of the vehicle, i.e. for performing adaptive cruise control, or for providing an autopilot function, e.g. in an autonomous vehicle. The method is simple and embedded friendly. Hence, it can be easily implemented in a processing module of a driving assistance system of a vehicle. The step can be applied for each frame as taken e.g. by a camera. Alternatively, the step can be performed every number of X frames, where X is an integer. Tracking a road feature provides a hint of a safe follow distance. When the time a road feature need to travel from a first appearance of a road feature behind the closest preceding vehicle to the vehicle is measured, based on a time-based rule for the safe distance, the safe distance can very easily be determined and applied. The safe distance can be equivalent e.g. to a distance the vehicle travels in two seconds driving time, i.e. the safe distance is the distance the vehicle travels in two seconds at a current speed, i.e. the safe distance is the distance the vehicle travels in two seconds at a current speed. Such a traffic rule for the safe distance being equivalent to a distance traveled in two seconds driving time can be a legal rule or a practical rule for safely driving the vehicle. Hence, this rule can be applied as a general rule. Of course, for control purposes, also other time durations than two seconds can be applied, including fractions of seconds. The road features can be tracked in the same way for features behind the vehicle, i.e. to determine at which speed a following vehicle is approaching. According to another calculation, the safe distance can be calculated as half of the vehicle speed, as measured in kilometers per hour, in meters.

According to a modified embodiment of the invention, the step of determining a road feature comprises scanning vertically down within road boundaries to identify a big texture change, providing a boundary box around the big texture change, and detecting the road feature within the boundary box. Hence, first an identification of the boundaries of the road is performed. The aim of this step is to detect and track features on the road. E.g. markings on road like botts' dots, dashed lane segments, small unique patterns on the road, or individual features including impurities or road holes, can be detected and tracked from time period to time period, e.g. from frame to frame. Within the one or more boundary box, a detailed analysis of features can be performed to detect e.g. possible splits in lanes and bolts or any other unique features.

According to a modified embodiment of the invention, the step of determining a distance to the closest preceding vehicle comprises generating a ground map, and determining the distance to the closest preceding vehicle based on the ground map. The ground map is a two-dimensional representation of a surrounding of the vehicle, i.e. in the style of a top view. This representation enables a simple identification e.g. of preceding vehicles and road features for use in the method. In addition, other features can be easily identified in the ground map. The ground map can be generated based on sensor information from one or more environment sensors, in particular using a LIDAR, a stereo camera, radar, or others.

According to a modified embodiment of the invention, the driving assistance system is an adaptive cruise control or an autonomous driving system.

These and other aspects of the invention will be apparent from and elucidated with reference to the embodiments described hereinafter. Individual features disclosed in the embodiments con constitute alone or in combination an aspect of the present invention. Features of the different embodiments can be carried over from one embodiment to another embodiment.

Figure 2:
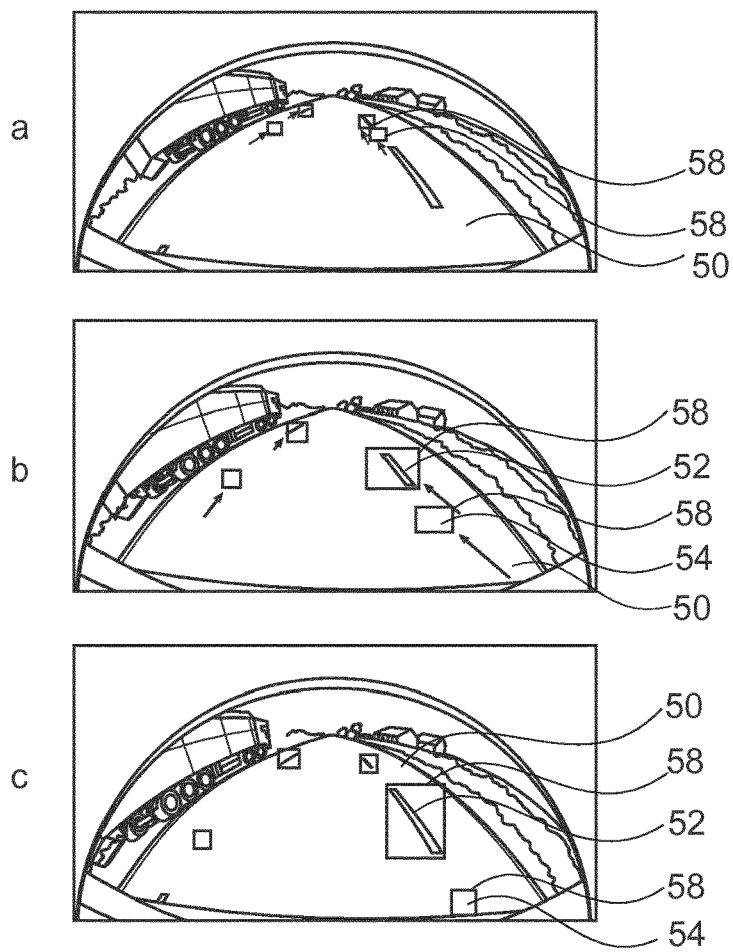
Figure 3:
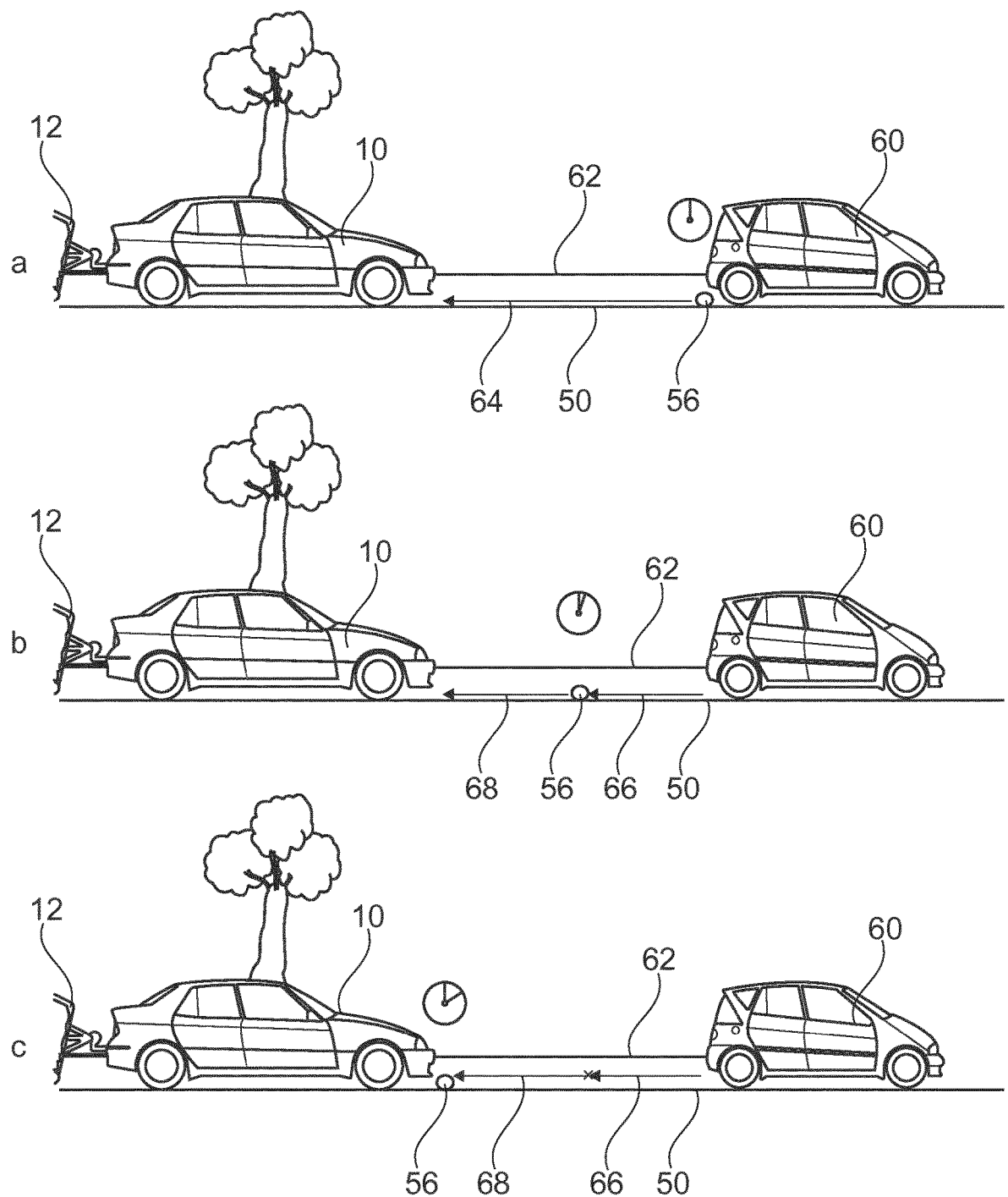
Figure 4:
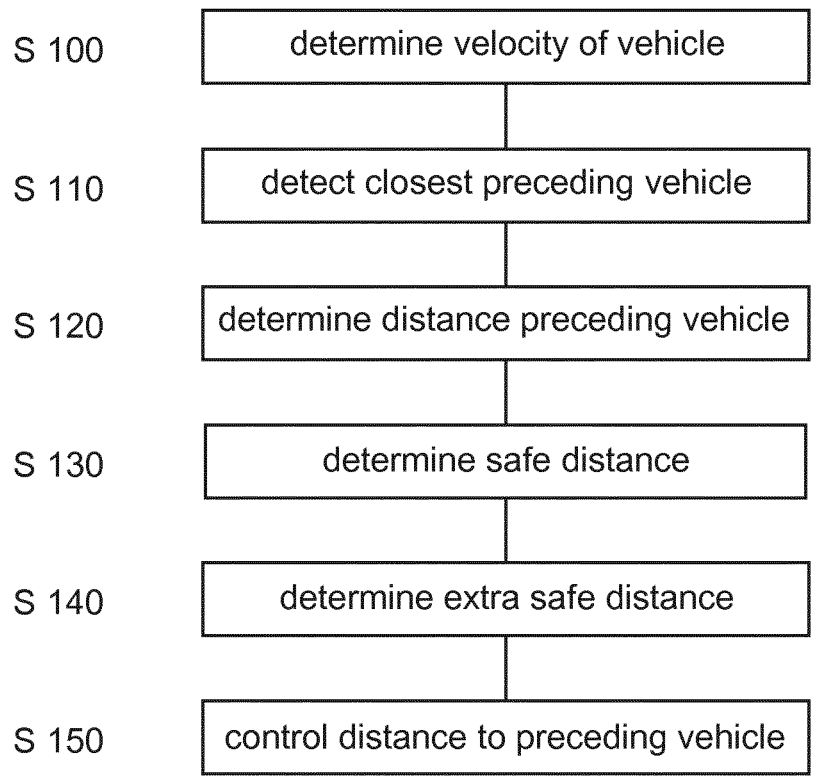

In the drawings:

FIG. 1 shows a schematic view of a driving assistance system of a vehicle according to a first, preferred embodiment, FIG. 2 contains three detailed pictures of a road for road feature detection, taken by a camera of the driving assistance system of the vehicle according to the first embodiment, in a perspective view at three subsequent points of time, FIG. 3 contains three schematic representations of the vehicle of the first embodiment behind a preceding car together with a road feature provided on the road, and FIG. 4 shows a flow chart of a method for controlling a distance of a vehicle to a closest preceding vehicle in accordance with the driving assistance system and the vehicle of the first embodiment.

FIGS. 1 and 3 refer to a vehicle 10 with a trailer 12 and a driving assistance system 14 for the vehicle 10 with the trailer 12 according to a first, preferred embodiment. The vehicle 10 is shown in FIG. 3. The driving assistance system 14 is schematically depicted in FIG. 1.

As can be seen in FIG. 1, the driving assistance system 14 comprises a central processing module 16, which will be discussed later in more detail. The driving assistance system 14 further comprises a rear camera 18 as rear input, which is mounted at a rear side of the vehicle 10. The driving assistance system 14 further comprises a front camera 20 as front input, which is mounted at a front side of the vehicle 10. The rear camera 18 and the front camera 20 are embodiments of environment sensors for monitoring the environment surrounding the vehicle 10.

The processing module 16 of the driving assistance system 14 comprises a trailer type detection module 22. The trailer type detection module 22 receives the rear input from the rear camera 18 and automatically determines a type of trailer 12 connected to the vehicle 10. The type of trailer 12 is provided to a trailer data extraction module 24 of the processing module 16.

The trailer data extraction module 24 accesses a memory of the driving assistance system 14, where physical data regarding characteristics of the different types of trailers 12 is stored in a database containing physical data for most common trailers. Hence, characteristics of the trailer 12 are automatically determined based on the type of the trailer 12. The trailer data extraction module 24 reads the physical data regarding characteristics of the trailer 12 connected to the vehicle 10. In this embodiment, the physical data comprises dimensions of the trailer 12, i.e. a length and width as well as height of the trailer 12, a weight of the trailer 12, and braking capabilities of the trailer 12 together with the vehicle 10. The trailer data extraction module 24 provides the physical data to an extra safe distance calculation module 26.

The processing module 16 further comprises a trailer angle detection module 28. The trailer angle detection module 28 receives the rear input from the rear camera 18 and determines an angle of the trailer 12 in respect to the vehicle 10. The determination of the angle of the trailer 12 in respect to the vehicle 10 is based in this embodiment on a tow bar detection and segmentation. The angle of the trailer 12 in respect to the vehicle 10 is provided as first input to a trailer motion model module 30.

The processing module 16 also comprises a vehicle odometry module 32. The vehicle odometry module 32 provides odometry information from the vehicle 10 as a second input to the trailer motion model module 30. The odometry information comprises e.g. a velocity the vehicle 10 as determined based on wheel rotation.

The trailer motion model module 30 determines a trailer motion model based on motion characteristics of the trailer 12. The motion characteristics allows predicting trailer 12 movement, in particular for sway conditions. The trailer motion model module 30 receives as input the odometry information of the trailer 12 and the angle of the trailer 12 in respect to the vehicle 10 to predict a movement of the trailer 12.

Both the trailer motion model module 30 and the vehicle odometry module 32 also provide information to the extra safe distance calculation module 26. As can be seen in FIG. 1, also the angle of the trailer 12 in respect to the vehicle 10 is provided as input to the extra safe distance calculation module 26.

The extra safe distance calculation module 26 calculates an extra safe distance for the vehicle 10 with the trailer 12 based on the provided inputs including the physical data of the trailer 12, as provided from the trailer data extraction module 24, the motion model, as provided from the trailer motion model module 30, the odometry information, as provided from the vehicle odometry module 32, and the angle of the trailer 12 in respect to the vehicle 10, as provided from the trailer angle detection module 28. The extra safe distance is an additional safe distance to be added to a safe distance, based on additional requirements when towing a trailer 12. The safe distance refers to a distance that enables the vehicle to securely performing a stop, e.g. without bumping against a preceding vehicle 60. It can be based on the assumption of the preceding vehicle 60 coming to an immediate stop, e.g. in case of an accident, or the preceding vehicle making an immediate breaking maneuver at maximum retardation, or any other suitable retardation.

The processing module 16 still further comprises a road edge detection module 34. The road edge detection module 34 receives the front input from the front camera 20 and determines edges or boundaries of a road 50, which can be seen in FIG. 2. Hence, the road edge detection module 34 receives frames as provided from the front camera 20. The information is provided for further processing to a road feature detection and tracking module 36.

The road feature detection and tracking module 36 performs a scanning vertically down in the frames provided from the front camera 20 within the road boundaries to identify a big texture change. It provides a boundary box 58 around the big texture change. Then, the road feature detection and tracking module 36 determines road features 52, 54, 56, which are in this embodiment a dashed lane segment 52 and a road hole 54, as can be seen e.g. with respect to FIG. 2, or an object 56, as can be seen with respect to FIG. 3. The road features 52, 54, 56 are detected and tracked within the respective boundary boxes 58 through frames provided by the front camera 20. Tracking of road features 52, 54, 56 can be seen in FIG. 2, where road features 52, 54, 56 are tracked through different frames. The road features 52, 54, 56 are tracked within their boundary boxes 58 when travelling from their first appearance behind the closest preceding vehicle 60, as can be seen in part a. of FIG. 2, until they reach the vehicle 10, as can be seen in part b. of FIG. 2.

The processing module 16 still further comprises a distance determination module 38. The distance determination module 38 operates based on a ground map, which is a two-dimensional representation of a surrounding of the vehicle 10 in the kind of a top view. Hence, the distance 62 to the closest preceding vehicle 60 based on the ground map. The ground map is generated by the road feature detection and tracking module 36 or the distance determination module 38.

Determination of the distance 62 between the vehicle 10 and the closest preceding vehicle 60 comprises determining each road feature 52, 54, 56, when appearing for a first time at a back of the closest preceding vehicle 60, until the road features 52, 54, 56 is not visible anymore. Hence, the distance 62 to the closest preceding vehicle 60 can be determined by the time, the road feature 52, 54, 56 requires for traveling along arrow 64 through the frames from the closest preceding vehicle 60 to the vehicle 10, as can be seen in FIG. 3. In this embodiment, the road features 52, 54, 56 are detected and tracked with a pre-set period, which corresponds to the period the frames as generated by the front camera 20. The distance determination module 38 then provides the determined distance 62 to a feedback module 40.

In particular, the distance determination module 38 works as follows. A first difference vector 66 is calculated based on a current position of a ground plane point, i.e. the respective road feature 52, 54, 56, and a reference ground plane point position. The reference ground plane point position is the position of the respective road feature 52, 54, 56, when appearing for a first time at the back of the closest preceding vehicle 60. The first difference vector 66 corresponds to a first change in distance, which is the length of the first difference vector 66 in meters. Subsequent difference vectors 68 are calculated in the same way based on a respective current position of ground plane point, i.e. the road feature 52, 54, 56, and a previous ground plane point position. The subsequent difference vector 68 corresponds to a subsequent change in distance, which is the length of the subsequent difference vector 68 in meters. Further subsequent difference vectors 68 can be calculated, until the road feature 52, 54, 56 is not visible anymore. The distance 62 between the closest preceding vehicle 60 and the vehicle 10 is calculated by adding the lengths of all difference vectors 66, 68 for the respective road feature 52, 54, 56 while traveling along arrow 64.

In an alternative embodiment, a change in distance of the road feature 52, 54, 56 is determined for each frame, and the changes in the distance are summed up for all periods.

Apart from the distance 62 provided from the distance determination module 38, the feedback module 40 receives the extra safe distance as provided from the extra safe distance calculation module 26. The safe distance is specified as a time of two seconds in this embodiment. The extra safe distance provided from the extra safe distance calculation module 26 is provided in terms of time and added to the safe distance to obtain a desired distance between the closest preceding vehicle 60 and the vehicle 10. Based on the distance 62 provided from the distance determination module 38, the feedback module 40 performs a control of the distance 62 between the vehicle 10 and the closest preceding vehicle 60 and provides a control output to an output module 42, which applies the control output to the vehicle 10 by breaking or accelerating the vehicle 10. Hence, the feedback module 40 controls the vehicle 10 to reduce its distance 62 to the closest preceding vehicle 60, if the distance 62 to the closest preceding vehicle 60 is bigger than the safe distance plus the extra safe distance, or to increase its distance 62 to the closest preceding vehicle 60, if the distance 62 to the closest preceding vehicle 60 is smaller than the safe distance plus the extra safe distance. Accordingly, the distance 62 is reliably maintained.

The control by the feedback module 40 is performed under additional consideration of further control parameters including speed limits, pre-set preferred traveling velocity, and traffic conditions. In general, the control is performed so that the distance 62 does not go below the desired distance to the preceding vehicle 60, whereas an increase of the distance 62 to the preceding vehicle 60 compared to the desired distance is tolerated, as long as it is based on additional control input.

The feedback module 40 continuously checks the distance 62 with respect to determine an updated extra safe distance.

Subsequently, a method for controlling the distance 62 of the vehicle 10 to the closest preceding vehicle 60 is discussed with respect to the flow chart of FIG. 4. The driving assistance system 14 is adapted to perform the method to control a distance 62 of the vehicle 10 to a closest preceding vehicle 60. The driving assistance system 14 is an adaptive cruise control or an autonomous driving system in according to the first embodiment. The different method steps can be performed in different sequences. Although described in a given order, this does not constitute a limitation that the method steps have to be performed in the described order.

The method starts with step S100, which refers to determining a velocity of the vehicle 10. The vehicle information is obtained from the vehicle odometry module 32 as discussed above.

In step S110, the closest preceding vehicle 60 is detected. The closest preceding vehicle 60 refers to a vehicle directly ahead of the own vehicle 10. Vehicles approaching on lanes belonging to opposite driving directions are not considered. Furthermore, in situations with multiple lanes for the same direction, the closest preceding vehicle 60 refers to the closest preceding vehicle 60 on the same lane. The closest preceding vehicle 60 is determined and tracked as a basis for the determination and tracking of road features 52, 54, 56 in the road feature detection and tracking module 36.

In step S120, a distance 62 to the closest preceding vehicle 60 is determined. The distance 62 is determined as described above with respect to the distance determination module 38.

In step S130, the safe distance is determined based on the velocity of the vehicle 10 and the distance 62 to the closest preceding vehicle 60. In this embodiment, the distance is defined in terms of time, so that by specifying a time of e.g. two seconds as equivalent to the safe distance considers both the velocity of the vehicle 10 and the distance 62 to the closest preceding vehicle 60.

In step S140, the extra safe distance is determined, as discussed above with respect to the extra safe distance calculation module 26.

In step S150, a control of the distance 62 to the closest preceding vehicle 60 is performed to stay above the safe distance plus the extra safe distance. The control is performed as discussed above with respect to the feedback module 40. Hence, the control of the distance 62 to the closest preceding vehicle 60 is performed by determining a distance 62 to the closest preceding vehicle 60, comparing the distance 62 to the closest preceding vehicle 60 to the safe distance plus the extra safe distance, and controlling the vehicle 10 to accelerate or decelerate via output module 42.

REFERENCE SIGNS LIST vehicle 10
trailer 12
driving assistance system 14
processing module 16
rear input, rear camera 18
front input, front camera 20
trailer type detection module 22
trailer data extraction module 24
extra safe distance calculation module 26
trailer angle detection module 28
trailer motion model module 30
vehicle odometry module 32
road edge detection module 34
road feature detection and tracking module 36
distance determination module 38
feedback module 40
output module, control output 42
road 50
road feature, dashed line segment 52
road feature, road hole 54
road feature, object 56
boundary box 58
preceding vehicle 60
distance 62
arrow 64
first difference vector, first change in distance 66
subsequent difference vector, subsequent change in distance 68

The invention claimed is:

1. A method for controlling a distance of a vehicle to a closest preceding vehicle, whereby the vehicle has a trailer connected thereto, the method comprising:
   determining a velocity of the vehicle;
   detecting a closest preceding vehicle;
   determining a distance to the closest preceding vehicle;
   determining a safe distance based on the velocity of the vehicle and the distance to the closest preceding vehicle;
   identifying a type of the trailer based on a rear input from a rear camera of the vehicle;
   determining an extra safe distance based on at least one characteristic of the trailer; and
   performing a control of the distance to the closest preceding vehicle to stay above the safe distance plus the extra safe distance by:
      comparing the distance to the closest preceding vehicle to the safe distance plus the extra safe distance, and
      controlling the vehicle to reduce the distance to the closest preceding vehicle when the distance to the closest preceding vehicle is greater than the safe distance plus the extra safe distance, and
      controlling the vehicle to increase the distance to the closest preceding vehicle when the distance to the closest preceding vehicle is smaller than the safe distance plus the extra safe distance, and
   wherein determining the distance to the closest preceding vehicle comprises:
      determining a road feature when appearing for a first time at a back of the closest preceding vehicle, determining a distance to the road feature with a pre-set period, until the road feature is not visible,
      determining a change in distance of the road feature for each period based on a front input from a front camera of the vehicle, and
      summing up the changes in the distance for all periods,
   wherein determining the extra safe distance based on at least one characteristic of the trailer comprises:
      determining a trailer motion model that generates a prediction of unstable swaying condition of the trailer based on odometry data of the trailer and an angle of the trailer, and
      determining, under consideration of the trailer motion model, the extra safe distance based on the prediction of the unstable swaying condition.

2. The method according to claim 1, wherein determining the extra safe distance based on at least one characteristic of the trailer further comprises determining trailer dimensions and determining the extra safe distance under consideration of the trailer dimensions.

3. The method according to claim 1, wherein determining the extra safe distance based on at least one characteristic of the trailer further comprises determining the at least one characteristic of the trailer based on the type of the trailer.

4. A driving assistance system for a vehicle, wherein the driving assistance system is adapted to perform the method according to claim 1 to control the distance of the vehicle to the closest preceding vehicle.

5. The driving assistance system according to claim 4, wherein the driving assistance system is an adaptive cruise control or an autonomous driving system.

6. A vehicle with a driving assistance system according to claim 4.

7. The method according to claim 1, further comprising:
   receiving a velocity of the trailer, wherein determining the extra safe distance based on at least one characteristic of the trailer further comprises determining the extra safe distance under consideration of the velocity of the trailer.

8. The method according to claim 1, wherein determining the road feature comprises scanning vertically down within road boundaries to identify a big texture change, providing a boundary box around the big texture change, and detecting the road feature within the boundary box.

9. The method according to claim 1, wherein determining the distance to the closest preceding vehicle comprises generating a ground map, and determining the distance to the closest preceding vehicle based on the ground map.

* * * * *